(12) United States Patent
Gehrke et al.

(10) Patent No.: US 9,499,018 B2
(45) Date of Patent: Nov. 22, 2016

(54) TRAILER COUPLING ASSISTANCE SYSTEM WITH VEHICLE VIDEO CAMERA

(71) Applicant: Robert Bosch GmbH, Stuttgart (DE)

(72) Inventors: Mark Gehrke, Ypsilanti, MI (US); James Stephen Miller, Dexter, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/675,872

(22) Filed: Apr. 1, 2015

(65) Prior Publication Data

US 2016/0288601 A1 Oct. 6, 2016

(51) Int. Cl.
| | |
|---|---|
| B60D 1/36 | (2006.01) |
| G05D 1/00 | (2006.01) |
| B62D 15/02 | (2006.01) |
| B60R 1/00 | (2006.01) |
| H04N 5/77 | (2006.01) |
| G06K 9/62 | (2006.01) |
| G06T 7/20 | (2006.01) |

(Continued)

(52) U.S. Cl.
CPC ............ B60D 1/36 (2013.01); B60Q 5/006 (2013.01); B60Q 9/008 (2013.01); B60R 1/003 (2013.01); B62D 15/025 (2013.01); G05D 1/0088 (2013.01); G06K 9/6201 (2013.01); G06K 9/6267 (2013.01); G06T 7/2033 (2013.01); H04N 5/77 (2013.01); B60R 2300/808 (2013.01); G06T 2207/10016 (2013.01); G06T 2207/30252 (2013.01)

(58) Field of Classification Search
CPC ......... B60D 1/36; B60D 1/06; B60W 30/00; B62D 15/0295; B62D 13/06; H04N 11/411; H04N 7/181; B60Q 9/005

USPC .............. 701/36, 41, 523; 37/417; 382/232; 280/477; 340/425.5; 348/148
See application file for complete search history.

(56) References Cited

U.S. PATENT DOCUMENTS

| | | | |
|---|---|---|---|
| 6,765,607 | B2 | 7/2004 | Mizusawa et al. |
| 7,171,769 | B2 | 2/2007 | Schultz et al. |
| 7,195,267 | B1 | 3/2007 | Thompson |

(Continued)

FOREIGN PATENT DOCUMENTS

| | | |
|---|---|---|
| DE | 102012001380 | 8/2012 |
| GB | 2513393 | 10/2014 |

OTHER PUBLICATIONS

International Search Report and Written Opinion for Application No. PCT/EP2016/052607 dated May 20, 2016 (11 pages).

*Primary Examiner* — Yuri Kan
(74) *Attorney, Agent, or Firm* — Michael Best & Friedrich LLP (57) ABSTRACT

A method and system for guiding a vehicle having a hitch connector to a trailer operates with a monocular vehicle video camera secured to a rear of the vehicle. In operation, the vehicle video camera generates video images from a rearward direction of the vehicle that are displayed. An electronic control unit including a processor is configured to: receive and display the video images, analyze the video images to confirm the location of a trailer coupler, analyze the video images to determine distance from a hitch connector of the vehicle to the trailer coupler, analyze the video images to determine height of the hitch connector of the vehicle, height of the trailer coupler of the trailer, and the relative height difference between the hitch connector of the vehicle and the trailer coupler of the trailer, and assist in guiding the vehicle to a trailer coupling position.

20 Claims, 5 Drawing Sheets

(51) Int. Cl.
   *B60Q 5/00*      (2006.01)
   *B60Q 9/00*      (2006.01)

(56) References Cited

U.S. PATENT DOCUMENTS

| | | | |
|---|---|---|---|
| 7,777,615 B2 | 8/2010 | Okuda et al. | |
| 2004/0032321 A1* | 2/2004 | McMahon | B60Q 9/005 340/425.5 |
| 2005/0074143 A1 | 4/2005 | Kawai | |
| 2005/0074173 A1* | 4/2005 | Lee | H04N 1/411 382/232 |
| 2005/0193603 A1* | 9/2005 | Schultz | B60D 1/36 37/417 |
| 2006/0038381 A1* | 2/2006 | Gehring | B60D 1/36 280/477 |
| 2006/0255560 A1 | 11/2006 | Dietz | |
| 2007/0040911 A1* | 2/2007 | Riley | H04N 7/181 348/148 |
| 2008/0180526 A1 | 7/2008 | Trevino | |
| 2008/0231701 A1 | 9/2008 | Greenwood et al. | |
| 2009/0271078 A1 | 10/2009 | Dickinson | |
| 2010/0096203 A1 | 4/2010 | Freese et al. | |
| 2010/0324770 A1 | 12/2010 | Ramsey et al. | |
| 2011/0216199 A1 | 9/2011 | Trevino et al. | |
| 2012/0158243 A1* | 6/2012 | Pupin | B62D 15/0295 701/36 |
| 2013/0226390 A1 | 8/2013 | Luo et al. | |
| 2014/0125795 A1 | 5/2014 | Yerke | |
| 2014/0188344 A1* | 7/2014 | Lavoie | B60W 30/00 701/41 |
| 2015/0115571 A1* | 4/2015 | Zhang | B60D 1/06 280/477 |
| 2015/0251697 A1* | 9/2015 | Lavoie | B62D 13/06 701/523 |

\* cited by examiner

TRAILER COUPLING ASSISTANCE SYSTEM WITH VEHICLE VIDEO CAMERA

BACKGROUND

The present invention relates to a trailer coupling assistance system including a video camera for guiding a vehicle to a coupling position with a trailer.

Methods for aiding a driver in attaching a vehicle hitch to a trailer are known. One method is set forth in PCT/US2014/066060 filed Nov. 18, 2014 and titled "Overhead View For Hitch Connection", the disclosure of which is hereby incorporated by reference in its entirety.

SUMMARY

In one embodiment, the invention provides a method of guiding a vehicle having a hitch connector to a trailer having a trailer coupler comprising: generating video images with a vehicle video camera mounted at a rear of the vehicle; receiving the video images at an electronic control unit including a processor and a memory; displaying the video images that include the trailer coupler and the trailer; analyzing the video images with the processor to determine a distance from the hitch connector of the vehicle to the trailer coupler; analyzing the video images with the processor to determine a height of the trailer coupler of the trailer relative to the hitch connector of the vehicle; and assisting in guiding the vehicle to a trailer coupling position.

In another embodiment, the vehicle video camera comprises a monocular vehicle video camera and the analyzing the video images to determine the presence of the trailer coupler comprises identifying the trailer coupler and its location in the video images.

In one embodiment, the identifying of the trailer coupler comprises identifying a general geometric shape of the trailer coupler and/or a set of features in the video images of the trailer coupler by comparing the geometric shape and/or set of features against a library of shapes and features for a group of trailer couplers stored in the memory.

In another embodiment, the identifying of the trailer coupler comprises identifying a general geometric shape of the trailer coupler and/or a set of features in the video images of the trailer coupler and locating the trailer coupler based on the relative location of the features and a priori understanding of typical trailer design.

In one embodiment, the assisting in guiding the vehicle to a trailer coupling position comprises tracking the trailer coupler across plural ones of the video images and providing visual and/or audio commands that include direction and amount that a steering wheel must be turned.

In another embodiment, the assisting in guiding the vehicle to a trailer coupling position comprises autonomous steering control of the vehicle without action by an operator.

One embodiment includes ending autonomous steering control in the event that the processor determines that the height of the trailer coupler is not disposed upward enough to avoid a collision with the hitch connector of the vehicle.

One embodiment includes providing at least one from a group of: an audio warning and a visual warning when the processor determines that the height of the trailer coupler is not disposed upward enough to avoid a collision with the hitch connector of the vehicle.

In one embodiment, the assisting in guiding the vehicle to a trailer coupling position comprises tracking the trailer coupler across plural video images and providing visual commands on a vehicle display on the vehicle console that include direction and amount that a steering wheel must be turned.

In one embodiment, analyzing the video images to determine a distance from the hitch connector to the trailer coupler comprises an operator touching an area at the location of the trailer coupler provided as the video image on the touch screen to enlarge in size the touched area, and the operator touching the enlarged area on the touch screen to locate the trailer coupling for tracking by the vehicle system.

In one embodiment, the invention provides a trailer coupling assistance system for guiding a vehicle having a hitch connector to a trailer coupler of a trailer comprising: a vehicle video camera mounted at the rear of the vehicle configured to generate video images; an electronic control unit including a processor and a memory, the electronic control unit configured to: receive the video images from the vehicle video camera, display the video images that include the trailer coupler and the trailer on a vehicle display, analyze the video images to determine a distance from a hitch connector of the vehicle to the trailer coupler, analyze the video images to determine a height of the trailer coupler of the trailer relative to the hitch connector, and assist in guiding the vehicle to a trailer coupling position.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways A vehicle 18 shown in FIG. 1 includes an electronic control unit (ECU) 20 that receives input video images from a rear vehicle video camera 22 mounted at a rear end of the vehicle. The rear vehicle video camera 22 has an image sensor for generating video images as a succession of frames. In some embodiments, the rear video camera 22 is a monocular video camera and/or a panoramic lens camera. The rear vehicle video camera 22 is disposed near a hitch connector 24. The hitch connector 24 is typically a ball type connector, but other types of connectors are contemplated.

Figure 1:
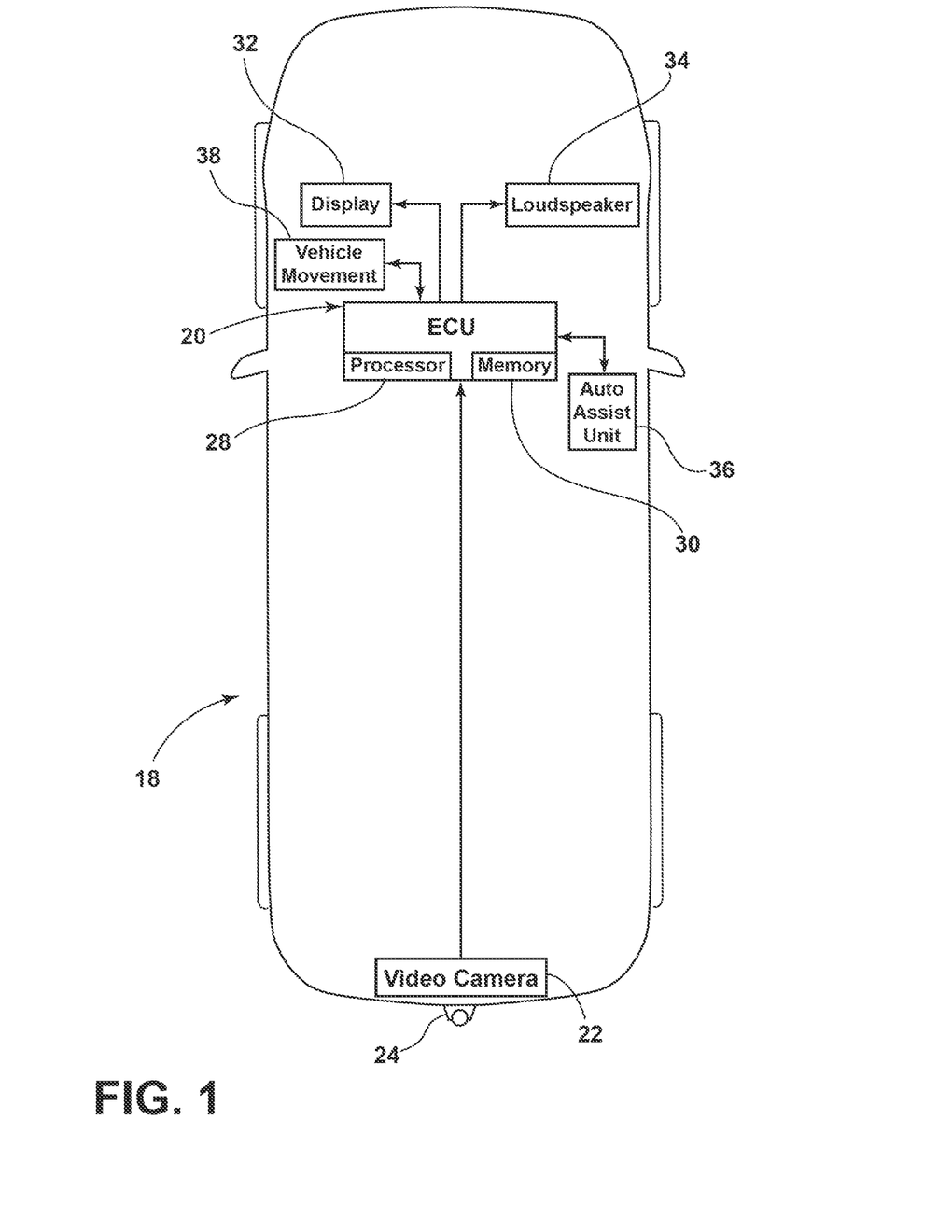
FIG. 1 is a block diagram of a vehicle with a trailer coupling assistance system.

FIG. 1 also shows the ECU 20 includes a processor 28. In one embodiment, the processor 28 is a microprocessor and in another embodiment, the processor is an application-specific integrated circuit (ASIC). In one embodiment, the processor 28 includes both analog and digital circuits. In other embodiments either of analog and digital circuits is provided. The processor 28 typically executes an algorithm with instructions of a computer program to assist in coupling a trailer coupling to a vehicle hitch connector.

In FIG. 1, memory 30 provides an algorithm or other computer program for execution of instructions by the processor 28. In different embodiments, the memory 30 is a non-volatile memory and/or a volatile memory.

In FIG. 1, the ECU 20 connects to a visual vehicle display 32 that can be a LCD monitor or other type of display. In one embodiment, the vehicle display 32 is a touchscreen that allows an operator to select objects shown on the vehicle display. The ECU 20 connects to a loudspeaker 34 and to an auto assist unit 36. The vehicle display 32 and loudspeaker 34 are connected directly to the ECU 20. In another embodiment, the vehicle display 32 and the loudspeaker 34 connect to the ECU 20 via a communication bus. In another embodiment, the vehicle display 32 and the loudspeaker 34 are controlled by another ECU (not shown) that communicates with the ECU 20. In some embodiments, the vehicle display 32 is disposed in a vehicle console and the loudspeakers 34 correspond to the entertainment loudspeakers. The ECU 20 overrides the entertainment sound when a warning is required from the loudspeakers 34.

In some embodiments, the auto assist unit 36 is a separate control unit from the ECU 20 or is incorporated in the ECU 20. In another embodiment, the auto assist unit 36 operates via multiple ECUs. A vehicle movement/position device 38 shown in FIG. 1 provides vehicle movement and position information to the ECU 20. The information includes steering wheel position and distance traveled. As with the auto assist unit 36, the information is continuously updated.

Figure 2:
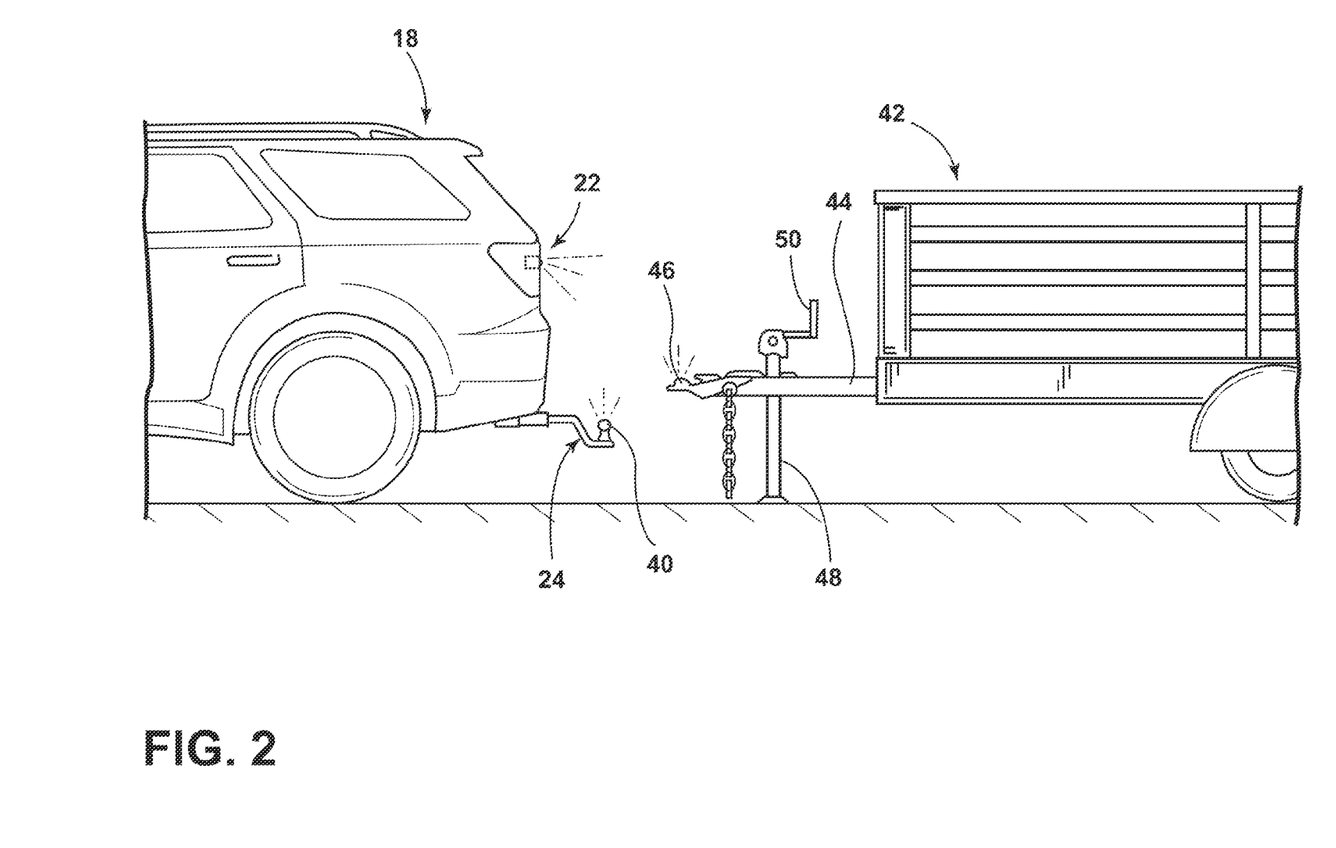
FIG. 2 is a side view of a vehicle and a trailer that are not coupled.

FIG. 2 shows an arrangement with a vehicle 18 having a vehicle video camera 22 mounted at an upper rear end of the vehicle and the hitch connector 24 including a ball mount 40. Trailer 42 includes a coupler frame 44 with a trailer coupler 46 and a support stand 48. In one embodiment, the trailer coupler 46 has a receiving aperture oriented downwardly and an adjustable tongue element for partially enclosing the ball mount 40 therein. The support stand 48 is integral with the coupler frame 44 and includes a crank 50 for lowering or raising the trailer coupler 46 with respect to a ground surface. While a ball mount 40 is shown, other types of connecting mechanisms and hitch connectors are contemplated. The invention is adaptable to fifth wheel arrangements, tractor trailer arrangements, and various other types of trailers.

Figure 3:
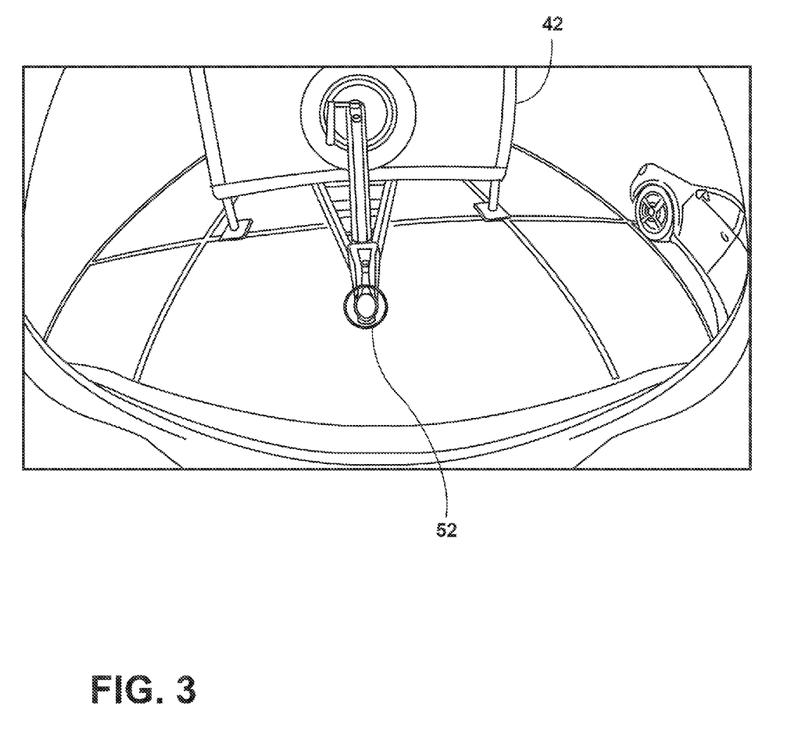
FIG. 3 is an image from a vehicle video camera.

FIG. 3 is an image taken by the vehicle video camera 22 disposed at the rear of the vehicle 18. In this embodiment, the camera is a panoramic camera. Besides use in assisting in the guidance of the vehicle to a trailer coupling position, the video images can be provided on the vehicle display 32 when the vehicle is in reverse. The image includes a circle 52 indicating a trailer coupler target or location for the vehicle hitch connector 24. While a panoramic camera is disclosed, other cameras are contemplated.

Operation

In a pre-operating step, the size and properties of the hitch connector 24 of the vehicle 18 must be known by the ECU 20. In some embodiments, a method includes an operator entering data via an interface to the ECU 20 providing dimensions for the ball mount 40 and data regarding the approximate height of the hitch connector 24 from the ground in typical conditions. Further, in some embodiments the operator provides data or the memory 30 is provided data regarding the distance and direction/orientation between the vehicle video camera 22 and the hitch connector 24. In some embodiments, information is loaded in the memory 30 for the above characteristics during installation of the vehicle system. In one embodiment, the vehicle display 32 is a touchscreen for also entering the above data. Further, the panoramic image is viewable on vehicle display 32. The vehicle display 32 shows the image in FIG. 3. Touching the area within the circle 52 allows a vehicle operator to define the location of the trailer coupler 46 in FIG. 3. In a two-step process, the area within the circle 52 is enlarged in size by the first touch of the screen. The second touch to the touch screen of the enlarged area of the video image that is provided on the vehicle display 32, more exactly locates the trailer coupling 46 for tracking by the vehicle system.

Vehicle Operator Control Embodiment

Figure 4:
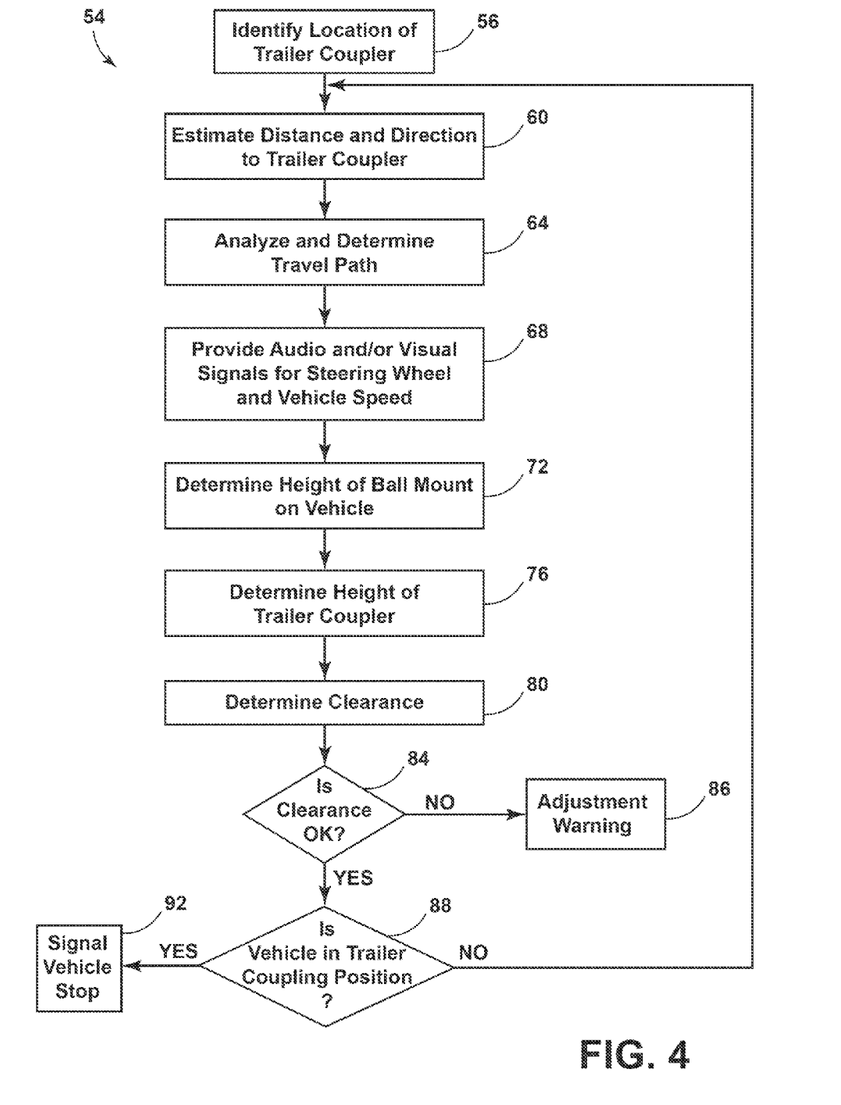
FIG. 4 is a flowchart of a vehicle operator control embodiment for coupling the vehicle and the trailer.

FIG. 4 is a flowchart 54 showing an operating method or process for a vehicle guidance system. In a first step 56, the vehicle operator identifies the location of the trailer coupler 46 as follows. The vehicle display 32 is a touchscreen that displays a video image toward the rear of the vehicle 18. As shown in FIG. 3, an operator views the video image on the vehicle display 32 and touches the area shown within the circle 52 for purposes of illustration. The touching is detected and the area within and about the circle is enlarged. Thereafter, the operator touches the enlarged trailer coupling 46 displayed on the vehicle display 32. The touching is detected at a location on the enlarged video image on an area of the touch screen that is then identified as the trailer coupling location. The trailer coupling location is a trailer coupling location point on screen image coordinates as shown in FIG. 4 of commonly owned U.S. application Ser. No. 14/675,862, filed Apr. 1, 2015 and incorporated by reference in its entirety. The trailer coupler location is stored and the processor 28 advances to step 60.

In some embodiments, the trailer coupler 46 is identified by video images from the video camera 22 that are compared with images stored in the memory 30 of the ECI 20. The processor 28 compares images to determine the presence and location of the trailer 42, and more importantly of the trailer coupler 46.

At step 60, in some embodiments the distance of the trailer coupler 46 from a ball mount 40 is determined in a manner similar to that arrangement set forth in commonly owned U.S. application Ser. No. 14/675,862. In this arrangement, however, known world coordinates of the ball mount 40 replace the world coordinates of the video camera 22 to determine the distance and direction of the trailer coupler 46 from the ball mount 40. The difference between the video camera world coordinates and the ball mount coordinates is pre-stored in the memory 30 of the ECU 20. Different x, y and z coordinates can be entered by a manufacturer or a by a vehicle operator after measuring the location of the ball mount 40 relative to the video camera 22. Thereafter, the processor 28 performs calculations using x, y and z coordinates for each of the ball mount 40 and the trailer coupler 46 for determining the distance and the direction.

In some embodiments the type of trailer coupler 46 is determined by the shape and size thereof. The screen coordinates also locate an image that is the shape of a trailer coupler at various angles. Further, the processor 28 determines the condition of the image including changes thereto in subsequent frames of the video images to determine when the location of the trailer coupler 46 changes coordinates.

In some embodiments, the processor 28 analyzes the video images to identify the specific trailer coupler to know whether the trailer coupler is compatible with the hitch connector 24. For instance, in some embodiments, a plurality of hitch connector dimensions/shapes and other properties are stored in memory 30. A classifier or classifier routine in the processor 28 is provided for comparing a general geometric shape of a trailer coupler 46 in a frame of the video images against a library of shapes and other features for a group of trailer couplers stored in the memory 30 to determine a specific type of trailer coupler. In another embodiment, the identifying of the trailer coupler comprises identifying a general geometric shape of the trailer coupler and/or a set of features in the video images of the trailer coupler and locating the trailer coupler based on the relative location of the features and a priori understanding of typical trailer design.

Further, the distance of the trailer coupler 46 from the vehicle video camera 22 and the hitch connector 24 is determined. In one embodiment, the distance from the vehicle video camera 22 is determined as disclosed in U.S. application Ser. No. 14/675,862. The processor 28 operates to compare x, y and z world coordinates of the hitch connector 24 and the trailer coupler 46. With this information, the relationship between the exact locations of the trailer coupler 46 and the hitch connector 24 a ball mount 40 is determined to obtain a distance therebetween and a direction. Thereafter, the processor 28 advances to step 64.

As set forth above, a vehicle movement/position device 38 provides vehicle movement and position information to the ECU 20. The information includes steering wheel position and distance traveled. In step 64, the processor 28 analyzes the determined distance of the hitch connector 24 from the trailer coupler 46 and determines a travel path including a steering angle and path to advance the hitch connector to the trailer coupling position. The processor 28 advances to step 68.

In step 68 of FIG. 4, the processor 28 provides audio and/or visual signals to the vehicle display 32 and the loudspeaker 34 in the vehicle 18 by tracking the trailer coupler 46 across frames of video images. The signals inform a vehicle operator how much and in what direction to modify the vehicle steering wheel position to obtain a proper location for advancing to the trailer coupling position. The signals are visual and/or audio commands that include proper direction and amount that a steering wheel must be turned. In one embodiment indicia provided on the vehicle display 32 provides direction and amount of steering wheel turning that is required. In another embodiment haptic signals are provided. Thereafter, the processor 28 advances to step 72.

At step 72, the processor 28 determines the height of the ball mount 40 from the video images and the distance determined above. In one embodiment, the height of the ball mount 40 is determined from the world coordinates corresponding to the location of the ball mount 40. The processor 28 then advances to step 76.

At step 76 of FIG. 4, the processor 28 determines the height of the trailer coupler 46 from the video images and the distance determined above. In one embodiment, the height of the trailer coupler 46 is determined from the world coordinates of the trailer coupler 46 corresponding to the location of the trailer coupler. Thereafter, the processor 28 advances to step 80.

At step 80, the processor 28 uses the height of the ball mount 40 and the trailer coupler 46 to determine the clearance of the trailer coupler 46 from the video images and the distances determined above. In one embodiment, the clearance is determined from the world coordinates corresponding to the known location of the ball mount 40 and the determined world coordinates of the trailer coupler 46. Thereafter, the processor 28 advances to step 84.

At step 84 of FIG. 4, the height of the trailer coupler 46 is compared to stored values and/or calculated values for height and location of the ball mount 40 of the hitch connector 24. The processor 28 may utilize the orientation or the determined direction from the ball mount 40 to the trailer coupler 46 to determine if the height of the trailer coupler is located upwardly and above the ball mount 40, to avoid a collision. If the clearance is considered insufficient or not enough to avoid a potential collision, the processor 28 advances to step 86.

At step 86, an adjustment warning is provided by the vehicle display 32 and/or the loudspeaker 34. In some embodiments, the warning is one or more from the group of an audio warning, a visual warning and haptic warning. In one embodiment, the warning is an audio message or verbal command. In another embodiment, the warning is indicia provided on the vehicle display 32. In response to the warning, an operator typically utilizes a crank 50 of the support stand 48 to increase the height of the trailer coupler 46. Returning to step 84, if the processor 28 determines that there is room/clearance for the hitch connector 24 to move under the trailer coupler 46, the processor advances to step 88.

At step 88 of FIG. 4, the processor 28 analyzes the distance data, etc. to determine whether the vehicle is in the trailer coupling position. If NO, the processor 28 advances to step 60 and reanalyzes and recalculates a travel path to the trailer coupling position. Thereafter, the processor advances to step 68 and provides updated signals to a driver for controlling the steering wheel position and optionally the vehicle speed. Thus, the program executed by the processor 28 of the system is tracking the trailer coupler 46 across a plurality of frames of video images.

After a number of iterations through the flow chart 54, at step 88, a program executed by the processor 28 determines that the hitch connector 24 is in the trailer coupling position with respect to the trailer coupler 46. The program advances to step 92.

At step 92 of FIG. 4, a vehicle stopping indication is provided. In instances when the vehicle operator misses the desired target trailer coupling position, steps 60, 64 operate to provide a travel path requiring that the vehicle be moved forwardly and away from the trailer coupler 46 resulting in another attempt to move the hitch connector 24 of the vehicle 18 to the trailer coupling position.

In the trailer coupling position, the ball mount 40 of the hitch connector 24 is essentially directly below the trailer coupler 46. Thereafter, an operator operates the crank 50 to lower the trailer support stand 48 to seat the trailer coupler 46 upon the ball mount 40. Then a tongue member is moved and secured so that the trailer coupler 46 is locked in a closed and secured position.

While the above embodiment discloses sensing the ball mount 40 of the vehicle 18 being in trailer coupling position and provides a stop signal, a stop signal is not necessary. In some embodiments, downwardly oriented video images from the video camera 22 provided on the vehicle display 32 show the relationship between the hitch connector 24 and the ball mount 40. Thus, additional audio and visual guidance is not required in some embodiments.

Autonomous Vehicle Control Embodiment

Figure 5:
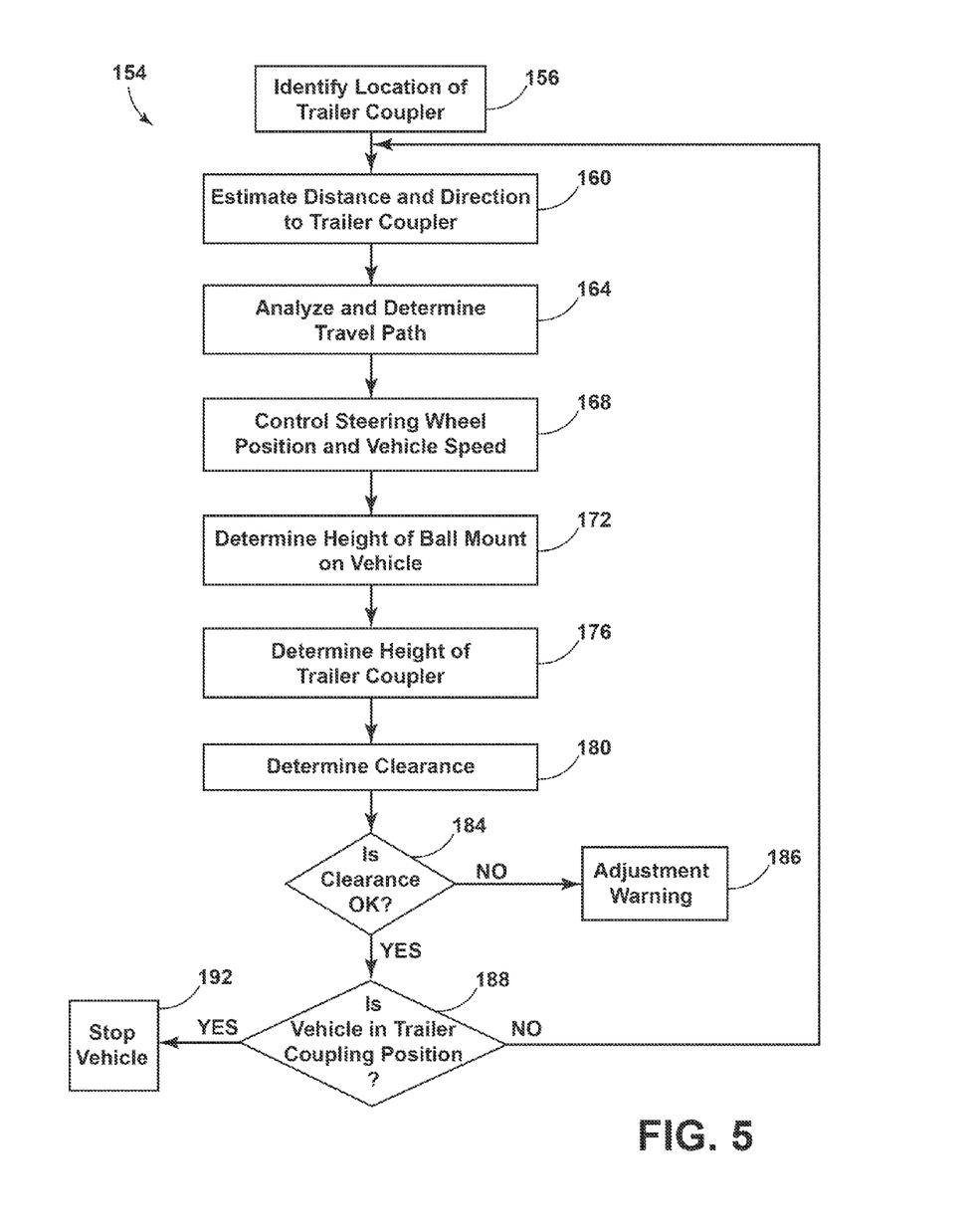
FIG. 5 is a flowchart of an autonomous vehicle control embodiment for coupling the vehicle and the trailer.

FIG. 5 is a flowchart 154 showing an operating method or process for an autonomous vehicle control system. This embodiment includes the auto assist unit 36, along with the vehicle motion/position device 38. In a first step 156, the vehicle operator identifies the location of the trailer coupler 46 as follows. The vehicle display 32 is a touchscreen that displays a video image toward the rear of the vehicle. As shown in FIG. 3, an operator views the video image on the vehicle display 32 and touches the area shown within the circle 52 for purposes of illustration. The touching is detected and the area within and about the circle is enlarged. Thereafter, the operator touches the enlarged trailer coupling 46 displayed on the vehicle display 32. The touching is detected at a location on the enlarged video image on an area of the touch screen that is then identified as the trailer coupling location. In one embodiment, the trailer coupling location is a trailer coupling location point on screen image coordinates. The trailer coupler location is stored and the processor 28 advances to step 160.

At step 160 of FIG. 5, in some embodiments the distance and direction of the trailer coupler 46 from a ball mount 40 is determined in a manner similar to that arrangements set forth above with respect to step 60 shown in FIG. 4. In one embodiment, the processor 28 operates to compare x, y and z world coordinates of the hitch connector 24 and the trailer coupler 46. With this information, the relationship between the exact locations of the trailer coupler 46 and the hitch connector 24 a ball mount 40 is determined to obtain a distance therebetween and a direction. Thereafter, the processor 28 advances to step 164.

As set forth above, a vehicle movement/position device 38 provides vehicle movement and position information to the ECU 20. The information includes steering wheel position and distance traveled. In step 164, the processor 28 analyzes the determined distance of the hitch connector 24 from the trailer coupler 46 and determines a travel path including a steering angle and path to advance the hitch connector to the trailer coupling position. The processor 28 advances to step 168.

At step 168 of FIG. 5, the auto assist unit 36 receives steering control signals and vehicle speed signals from the processor 28 of the ECU 20 and controls the vehicle independently from and without input by the vehicle operator. Thus, the autonomous steering control operates the vehicle without action by the vehicle operator. The processor advances to step 172.

At step 172, the processor 28 determines the height of the ball mount 40 from the video images and the distance determined above. In one embodiment, the height of the ball mount 40 is determined from the world coordinates corresponding to the location of the ball mount 40. The processor 28 then advances to step 176.

At step 176, the processor 28 determines the height of the trailer coupler 46 from the video images and the distance determined above. In one embodiment, the height of the trailer coupler 46 is determined from the world coordinates of the trailer coupler 46 corresponding to the location of the trailer coupler. Thereafter, the processor 28 advances to step 180.

At step 180 of FIG. 5, the processor 28 uses the height of the ball mount 40 and the trailer coupler 46 to determine the clearance of the trailer coupler 46 from the video images and the distances determined above. Thereafter, the processor 28 advances to step 184.

At step 184, the height of the trailer coupler 46 is compared to stored values and/or calculated values for height and location of the ball mount 40 of the hitch connector 24. The processor 28 may utilize the orientation or the determined direction from the ball mount 40 to the trailer coupler 46 to determine if the height of the trailer coupler is located upwardly and above the ball mount 40, to avoid a collision. If the clearance is considered insufficient or not enough to avoid a potential collision, the processor 28 advances to step 186.

At step 186, an adjustment warning is provided by the vehicle display 32 and/or the loudspeaker 34. Returning to step 184, if the processor 28 determines that there is room/clearance for the hitch connector 24 to move under the trailer coupler 46, the processor advances to step 188.

At step 188 of FIG. 5, the processor 28 analyzes the distance data, etc. to determine whether the hitch connector 24 of the vehicle 18 is in the trailer coupling position. If not, the processor 28 advances/returns to step 160 and estimates distance and direction to the trailer coupler. Thereafter, at step 164 the processor 28 reanalyzes and recalculates a travel path to the trailer coupling position. Thereafter, the processor 28 advances to step 168 and updated signals control the steering wheel position and the vehicle speed. Thus, the program executed by the processor 28 of the system is tracking the trailer coupler 46 across a plurality of frames of video images.

After a number of iterations through the flow chart 154, at step 188 a program executed by the processor 28 determines that the hitch connector 24 is in the trailer coupling position with respect to the trailer coupler 46. The program advances to step 192. At step 192 of FIG. 5, the autonomous vehicle control is discontinued as the vehicle 18 is stopped.

In the trailer coupling position, the ball mount 40 of the hitch connector 24 is essentially directly below the trailer coupler 46. Thereafter, an operator operates the crank 50 to lower the trailer support stand 48 to seat the trailer coupler 46 upon the ball mount 40. Then a tongue member is moved and secured so that the trailer coupler 46 is locked in a closed and secured position. Other types of hitch connectors are also contemplated.

The flowcharts in FIGS. 4 and 5 are for purposes of explanation only. Different orders for the steps are contemplated as well as different arrangements. In the embodiments of FIG. 5, the processor 28 also determines the height of the trailer coupler 46 relative to the hitch connector 24. In the event that the processor 28 determines that an uneven ground path or other condition will cause the relative height or clearance to change in the autonomous vehicle control mode, the processor 28 operates to end autonomous steering control and prevent a collision between the hitch connector 24 and the trailer coupler 46.

In one embodiment, the electronic control unit 20 includes a classifier that is configured to identify a trailer coupler 46 by comparing a general geometric shape of a trailer coupler 46 in a frame of the video images with a set of features thereof used by or identified by a classifier against a library of shapes and other features for a group of trailer couplers stored in the memory 30.

In some embodiments, the processor 28 determines whether the trailer coupler 46 is properly identified or classified. If the trailer coupler 46 is the wrong size for the ball mount 40 or has been lost during repeating of the process shown in FIG. 4, the processor 28 provides a visual and/or audio warning that the trailer coupler 46 is lost and thus cannot be provided to the hitch connector 24 of the vehicle 18. In some embodiments, a different warning is issued when knowledge is provided that the ball mount 40 is not a proper size. In some embodiments, the vehicle operator may manually enter trailer coupler size and identification information, along with size and identification information for the ball mount 40.

While the above description states that the processor 28 performs the steps shown in the flowcharts of FIGS. 4 and 5, the electronic control unit 20 that includes the processor 28 also is considered as performing the steps. Further, the invention contemplates providing a hydraulic or other powered adjustment for raising or lowering the hitch connector 24 and ball mount 40 to ensure proper height for securing the trailer coupler 46 to the hitch connector.

Thus, the invention provides, among other things, a simplified user friendly approach to connecting a trailer 42 to a vehicle 18. Various features and advantages of the invention are set forth in the following claims.

What is claimed is:

1. Method of guiding a vehicle having a hitch connector to a trailer having a trailer coupler comprising:
   generating video images with a vehicle video camera mounted at a rear of the vehicle;
   receiving the video images at an electronic control unit including a processor and a memory;
   displaying the video images that include the trailer coupler and the trailer;
   analyzing the video images with the processor to determine a distance from the hitch connector of the vehicle to the trailer coupler;
   analyzing the video images with the processor to determine a height of the hitch connector of the vehicle, a height of the trailer coupler of the trailer, and the relative height difference between the hitch connector of the vehicle and the trailer coupler of the trailer; and
   assisting in guiding the vehicle to a trailer coupling position.

2. The method according to claim 1, wherein the vehicle video camera comprises a monocular vehicle video camera and the analyzing of the video images by the processor to determine the presence of the trailer coupler comprises identifying the trailer coupler and its location in the video images.

3. The system according to claim 2, wherein the electronic control unit includes a classifier that is configured to identify a trailer coupler by comparing a general geometric shape of the trailer coupler and/or a set of features against a library of geometric shapes and sets of features for a group of trailer couplers stored in the memory.

4. The method according to claim 2, wherein the identifying of the trailer coupler comprises identifying a general geometric shape of the trailer coupler and/or a set of features in the video images of the trailer coupler and locating the trailer coupler based on the relative location of the features and a priori understanding of typical trailer design.

5. The method according to claim 1, wherein the assisting in guiding the vehicle to a trailer coupling position comprises tracking the trailer coupler across plural ones of the video images and providing visual and audio commands that include direction and amount that a steering wheel must be turned by an operator.

6. The method according to claim 1, wherein the assisting in guiding the vehicle to a trailer coupling position comprises autonomous steering control of the vehicle without action by an operator.

7. The method according to claim 6, including ending autonomous steering control in the event that the processor determines that the height of the trailer coupler is not disposed upward enough to avoid a collision with the hitch connector of the vehicle.

8. Method of guiding a vehicle having a hitch connector to a trailer having a trailer coupler comprising:
   generating video images with a vehicle video camera mounted at a rear of the vehicle and oriented rearwardly whereby the generated video images include the trailer and the trailer coupler;
   receiving the generated video images at an electronic control unit including a processor and a memory;
   displaying the generated video images that include the trailer coupler and the trailer on a vehicle display;
   analyzing the generated video images that include the trailer coupler with the processor to determine a distance from the hitch connector of the vehicle to the trailer coupler;
   analyzing the generated video images with the processor to determine a height of the hitch connector of the vehicle, a height of the trailer coupler of the trailer, and the relative height difference between the hitch connector of the vehicle and the trailer coupler of the trailer;
   assisting in guiding the vehicle to a trailer coupling position; and
   providing an audio warning and a visual warning when the processor determines that the height of the trailer coupler is not disposed upward enough to avoid a collision with the hitch connector of the vehicle,
   wherein the assisting in guiding the vehicle to a trailer coupling position includes tracking the trailer coupler across plural ones of the generated video images and providing visual and audio commands that include direction and amount that a steering wheel must be turned by an operator.

9. The method according to claim 1, wherein the assisting in guiding the vehicle to a trailer coupling position comprises tracking the trailer coupler across plural video images and providing visual commands on a vehicle display on the vehicle console that include direction and amount that a steering wheel must be turned by an operator.

10. The method according to claim 1, further comprising a vehicle display that includes a touchscreen for displaying the video images, wherein the analyzing of the video images to determine a distance from the hitch connector to the trailer coupler comprises: an operator touching an area at the location of the trailer coupler provided as the video image on the touch screen to enlarge in size the touched area, and the operator touching the enlarged area on the touch screen to locate the trailer coupling for tracking by the vehicle system.

11. A trailer coupling assistance system for guiding a vehicle having a hitch connector to a trailer coupler of a trailer comprising:
   a vehicle video camera mounted at the rear of the vehicle configured to generate video images;
   an electronic control unit including a processor and a memory, the electronic control unit configured to:
     receive the video images from the vehicle video camera;
     display the video images that include the trailer coupler and the trailer on a vehicle display;
     analyze the video images to determine a distance from a hitch connector of the vehicle to the trailer coupler;
     analyze the video images to determine a height of the trailer coupler of the trailer relative to the hitch connector; and
     assist in guiding the vehicle to a trailer coupling position.

12. The system according to claim 11, wherein the vehicle video camera comprises a monocular vehicle video camera and the electronic control unit is configured to analyze the video images to determine the presence of the trailer coupler by identifying the trailer coupler and its location in the image.

13. The system according to claim 12, wherein the electronic control unit includes a classifier that is configured to identify a trailer coupler by comparing a general geometric shape of the trailer coupler and/or a set of features against a library of geometric shapes and sets of features for a group of trailer couplers stored in the memory.

14. The system according to claim 12, wherein the identifying of the trailer coupler comprises identifying a general geometric shape of the trailer coupler and/or a set of features in the video images of the trailer coupler and locating the coupler based on the relative location of the features and a priori understanding of typical trailer design.

15. The system according to claim 11, wherein the electronic control unit is configured to assist in guiding the vehicle to a trailer coupling position by tracking the trailer coupler across frames of video images and providing audio commands including proper direction and amount of steering changes by a steering wheel to be performed by an operator.

16. The system according to claim 11, wherein the electronic control unit is configured to assist in guiding the vehicle to a trailer coupling position by providing autonomous steering control of the vehicle without action by an operator.

17. The system according to claim 16, wherein the electronic control unit is configured to end autonomous steering control in the event that the processor determines that the height of the trailer coupler is not disposed upwardly enough to avoid a potential collision with the hitch connector of the vehicle.

18. The system according to claim 11, wherein the electronic control unit is configured to provide at least one from a group of: an audio warning from a loudspeaker and a visual warning from the vehicle display when the electronic control unit determines that the height of the trailer coupler is not disposed upwardly enough to avoid a potential collision with the hitch connector of the vehicle.

19. The system according to claim 11, wherein the electronic control unit is configured to assist in guiding the vehicle to a trailer coupling position by tracking the trailer coupler across frames of video images and providing visual indicia on the vehicle display in the vehicle console, the indicia including proper direction and amount of steering changes for a steering wheel to be performed by an operator.

20. The system according to claim 11, wherein the vehicle display includes a touchscreen, and wherein the vehicle display provides the location of the trailer coupler on the video images, by an operator touching an area at the location of the trailer coupler provided on the vehicle display to enlarge in size the video image from the area touched by an operator, and wherein an operator touches the enlarged area to locate the trailer coupling for tracking by the vehicle system.

* * * * *